United States Patent
Goto et al.

(10) Patent No.: US 7,582,370 B2
(45) Date of Patent: Sep. 1, 2009

(54) FUEL CELL SYSTEM

(75) Inventors: Kenichi Goto, Yamato (JP); Tetsuya Kamihara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 817 days.

(21) Appl. No.: 11/077,232

(22) Filed: Mar. 11, 2005

(65) Prior Publication Data

US 2005/0214604 A1 Sep. 29, 2005

(30) Foreign Application Priority Data

Mar. 26, 2004 (JP) ............... 2004-092564

(51) Int. Cl.
*H01M 8/04* (2006.01)
(52) U.S. Cl. ............... 429/13; 429/22; 429/24
(58) Field of Classification Search ............ 429/13, 429/22, 24
See application file for complete search history.

(56) References Cited

U.S. PATENT DOCUMENTS

| | | | |
|---|---|---|---|
| 6,103,410 A * | 8/2000 | Fuller et al. ............... | 429/13 |
| 6,124,054 A | 9/2000 | Gorman et al. | |
| 6,461,751 B1 * | 10/2002 | Boehm et al. ............... | 429/13 |
| 6,852,434 B2 * | 2/2005 | Reindl et al. ............... | 429/22 |
| 6,977,121 B2 * | 12/2005 | Balliet et al. ............... | 429/22 |
| 2003/0129462 A1 | 7/2003 | Yang et al. | |
| 2004/0013919 A1 | 1/2004 | Ueda et al. | |

FOREIGN PATENT DOCUMENTS

JP 2004-055287 A 2/2004

* cited by examiner

*Primary Examiner*—Stephen J. Kalafut
(74) *Attorney, Agent, or Firm*—Foley & Lardner LLP

(57) ABSTRACT

A fuel cell system includes a fuel cell stack comprising an anode (fuel electrode) and a cathode (oxidizer electrode), and a system startup run is conducted at the system startup to bring the fuel cell stack into a power extractable state (idle state). In the fuel cell system, air supply flow is controlled so that air in an amount larger than a reference flow required to bring the fuel cell stack into the power extractable state, is supplied to the cathode over a preset time from the start of air supply to the cathode, by estimating an amount of hydrogen present on the cathode, deciding an air supply flow increment to commensurate with the estimated hydrogen amount, and controlling an air supply flow, whereby air at a flow rate provided by adding the decided increment to the reference flow, is supplied to the cathode during the system startup run, thereby allowing to effectively restrict a disadvantage in that a high concentration of hydrogen is wasted during the system startup run, without deteriorating the efficiency of the fuel cell system.

7 Claims, 8 Drawing Sheets

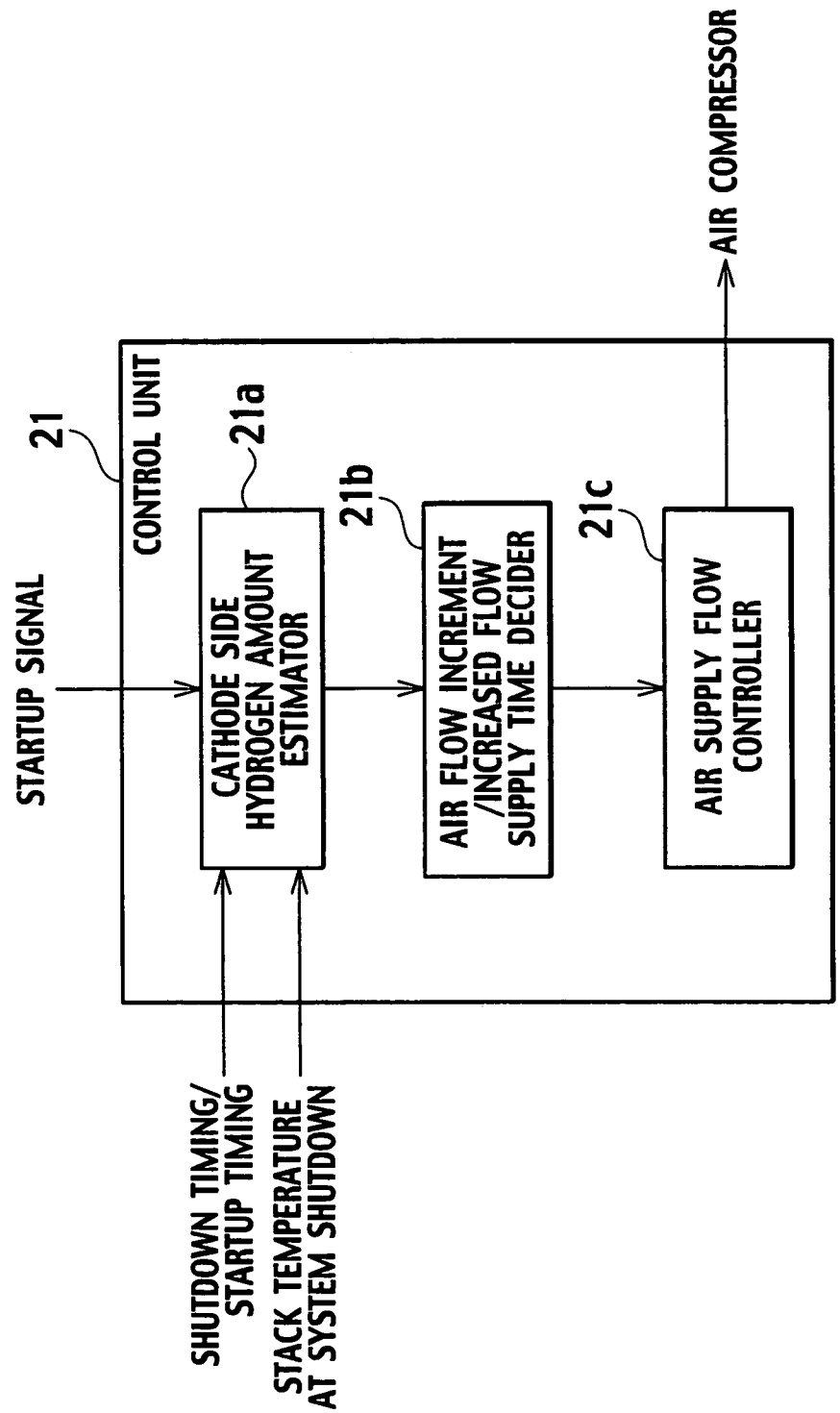

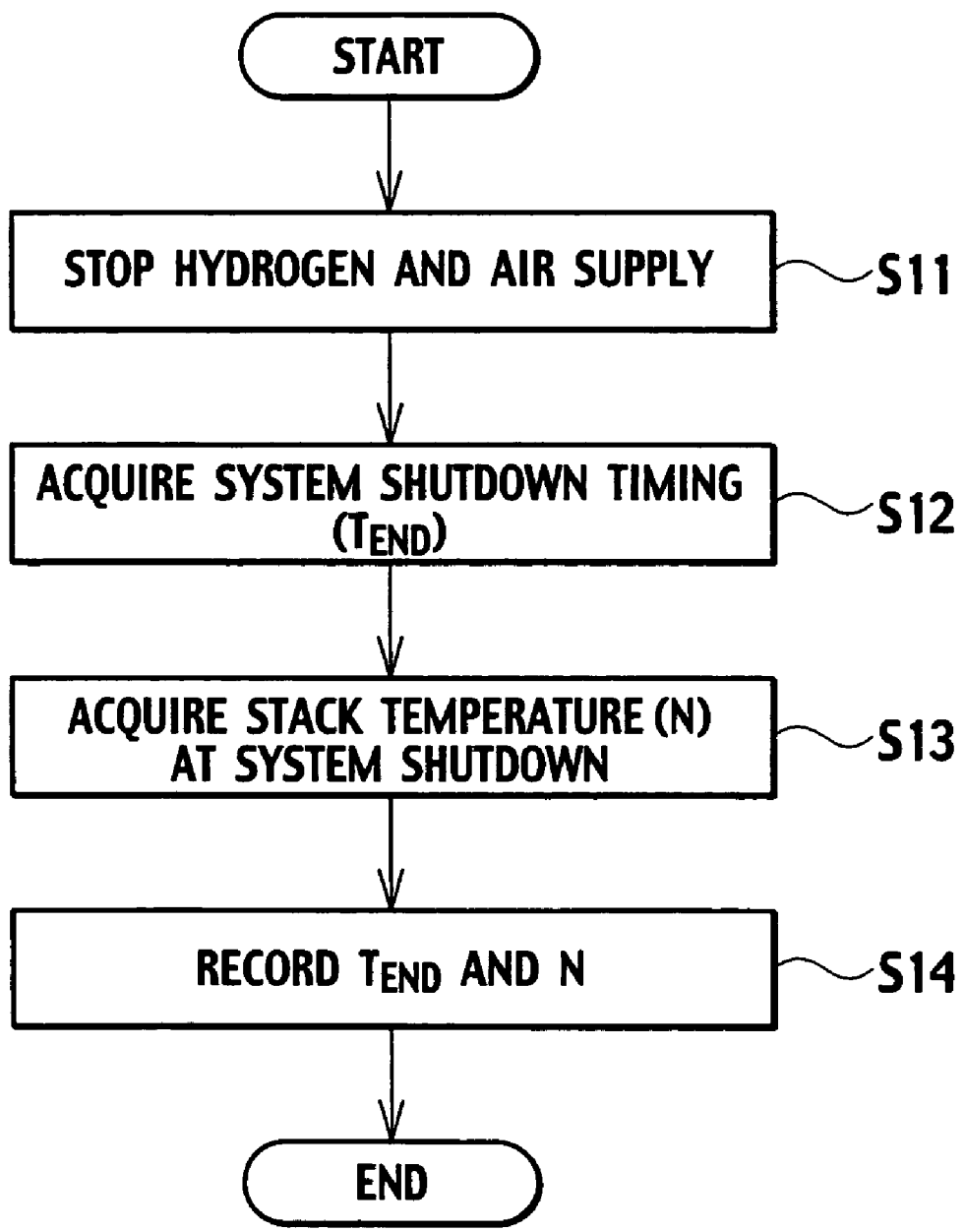

FUEL CELL SYSTEM

BACKGROUND OF THE INVENTION

1. Field of the Invention

The present invention relates to a fuel cell system, and particularly, to a fuel cell system including a solid polymer electrolyte fuel cell which wastes hydrogen during a startup run of the system.

2. Description of Relevant Art

As countermeasures against recent environmental problems, particularly against such problems as air pollution due to exhaust gases from the vehicle, and global warming due to carbon dioxide, attention has been directed to fuel cell systems having clean waste gases and high energy efficiencies.

The fuel cell system is an energy converting system configured with one or more fuel cells each having a fuel electrode (anode) supplied with a gaseous fuel such as hydrogen and an oxidizer electrode (cathode) supplied with a gaseous oxidizer such as air, for promoting electrochemical reactions in between to convert chemical energy of the fuel into electrical energy to be output.

The fuel cell is categorized by its electrolyte. The solid polymer electrolyte fuel cell is a fuel cell using a solid polymer membrane as the electrolyte. This type of fuel cell can be made compact at low cost, allowing for high power density, and is employed in the most of fuel cell systems constituting a drive power source for vehicles.

For most fuel cells, the fuel is hydrogen, which is a flammable gas needing careful handling. Fuel cell systems provided with a fuel cell using hydrogen as the fuel emit a waste gas containing hydrogen, and need some countermeasures to control the concentration of hydrogen in the waste gas.

In particular, for fuel cell systems constituting a drive power source for vehicles, such countermeasures should have a sufficient effect not to emit a waste gas high of hydrogen concentration, outside a vehicle, for example.

There is a technique proposed from such a standpoint in Japanese Patent Application Laid-Open Publication No. 2004-55287 for a hydrogen purge for wasting hydrogen with mixed impurities such as nitrogen and moisture accumulated on the fuel electrode side during running of a fuel cell system, in which hydrogen wasted at the fuel electrode side is sufficiently diluted with air wasted at the oxidizer electrode side, to be emitted outside a vehicle.

SUMMARY OF THE INVENTION

In the above-noted Japanese Patent Application Laid-Open Publication No. 2004-55287, waste hydrogen from a fuel electrode is sufficiently diluted with waste air from an oxidizer electrode during the hydrogen purge in a running of the fuel cell system. However, there is no consideration or countermeasures provided to or for hydrogen concentration control of waste gas in a startup run of fuel cell systems that include a solid polymer electrolyte fuel cell.

In fuel cell systems including a solid polymer electrolyte fuel cell using hydrogen as the fuel, filled hydrogen on the fuel electrode side permeates through a solid polymer electrolyte membrane, cross-leaking to the oxidizer electrode side, during a system shutdown. Typically, the system shutdown is followed by a system startup to enter a system startup run for supplying the fuel cell with hydrogen and a minimum amount (as a reference flow) of air, as necessary for maturing the fuel cell into a power extractable idling state, where it can serve as a power source for supplying required power to the load.

In a system startup run after a relatively long system shutdown, the fuel cell may have a relatively large amount of hydrogen having cross-leaked to and accumulated on the oxidizer electrode side, where the minimum amount of air is supplied. As a result, the fuel cell has on the oxidizer electrode side an air-hydrogen mixture relatively high of hydrogen concentration, which should be sufficiently diluted with air before emission from the system.

The cross-leak of hydrogen from the fuel electrode side to the oxidizer electrode side might have been well decreased with an increased thickness of a solid polymer electrolyte membrane interposed therebetween, which however accompanies a commensurate decrease in efficiency of the fuel cell.

The present invention has been made in view of the foregoing points. Therefore, it is an object of the invention to provide a fuel cell system including a solid polymer electrolyte fuel cell, allowing an emission of a waste gas with a controlled hydrogen concentration, and a maintained fuel cell efficiency.

To achieve the object, according to an aspect of the invention, a fuel cell system includes a solid polymer electrolyte fuel cell configured with a fuel electrode, an oxidizer electrode, and a solid polymer membrane interposed therebetween, the fuel cell being operative at a startup of the fuel cell system to enter a startup run of the fuel cell system, where the fuel electrode is supplied with hydrogen and the oxidizer electrode is supplied with air at a reference flow to mature the fuel cell into a power extractable state, the fuel cell system comprising a hydrogen amount estimator configured to estimate an amount of hydrogen in the oxidizer electrode at the startup, a flow increment decider configured to decide an increment of a supply flow of air to the oxidizer electrode, depending on the estimated amount of hydrogen, and an air flow controller configured to control the supply flow of air to a sum of the reference flow and the decided increment for an interval of time from a commencement of air supply to the fuel cell during the system startup run.

To achieve the object described, according to another aspect of the invention, a control method is provided for a fuel cell system including a solid polymer electrolyte fuel cell configured with a fuel electrode, an oxidizer electrode, and a solid polymer membrane interposed therebetween, the fuel cell being operative at a startup of the fuel cell system to enter a startup run of the fuel cell system, where the fuel electrode is supplied with hydrogen, and the oxidizer electrode is supplied with air at a reference flow to mature the fuel cell into a power extractable state, the control method comprising estimating an amount of hydrogen in the oxidizer electrode at the startup, deciding an increment of a supply flow of air to the oxidizer electrode, depending on the estimated amount of hydrogen, and controlling the supply flow of air to a sum of the reference flow and the decided increment for an interval of time from a commencement of air supply to the fuel cell during the system startup run.

BRIEF DESCRIPTION OF THE ACCOMPANYING DRAWINGS

The above and further objects, features, and advantages of the present invention will appear more fully from the detailed description of the preferred embodiments, when the same is read in conjunction with the accompanying drawings, in which:

FIG. 5 is a block diagram of a control unit for controlling an air flow during a system startup run of a fuel cell system according to a second embodiment of the invention;

FIG. 7 is a flowchart of control actions for a system shutdown of the fuel cell system according to the second embodiment.

DETAILED DESCRIPTION OF THE PREFERRED EMBODIMENTS

There will be an explanation of the preferred embodiments of the present invention in detail, with reference to the accompanying drawings.

First Embodiment

Figure 1:
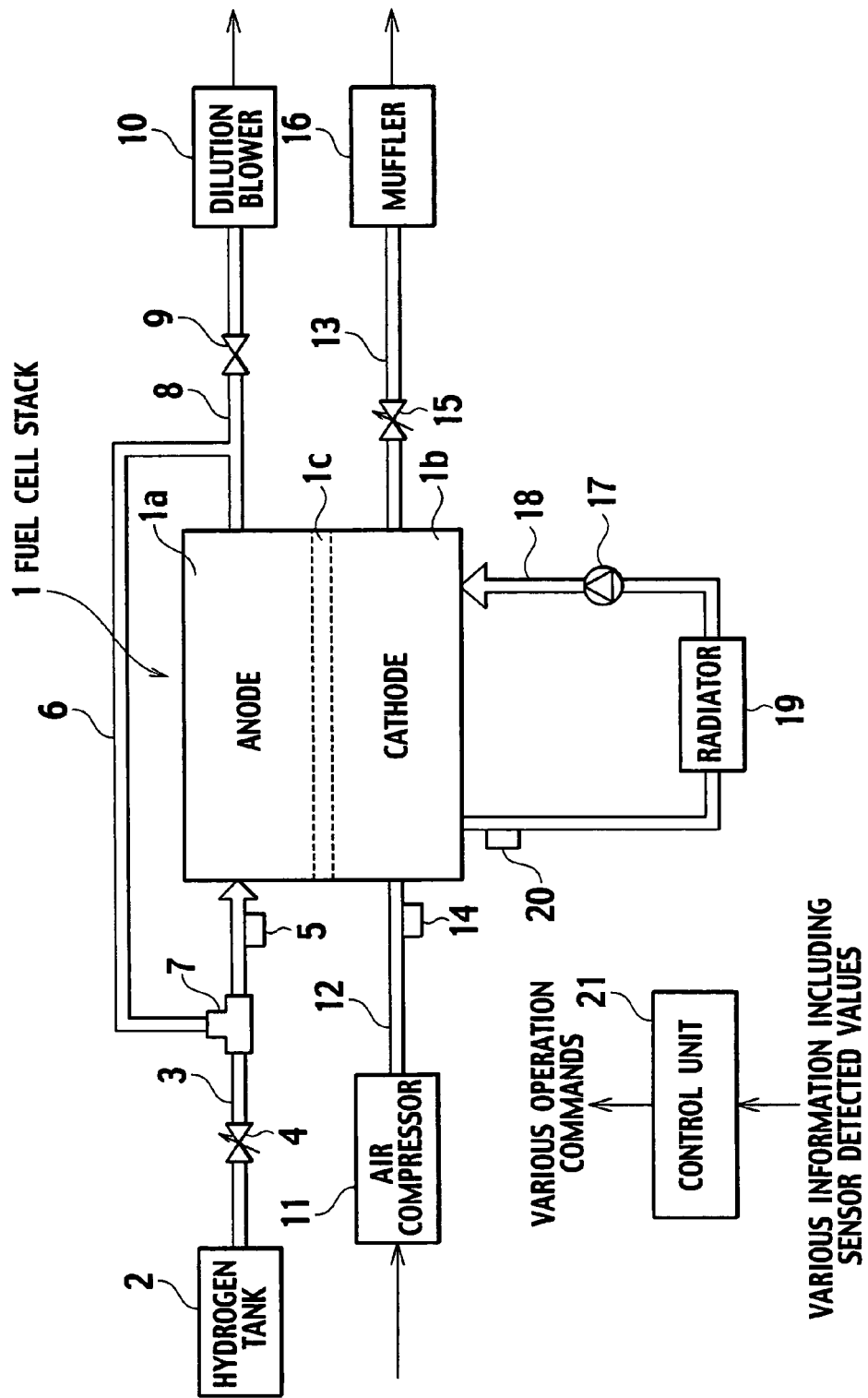
FIG. 1 is a block diagram of an essential portion of a fuel cell system according to a first embodiment of the invention.

FIG. 1 shows, in block diagram, an essential portion of a fuel cell system according to a first embodiment of the invention. This fuel cell system is configured as a power generation system for fuel cell vehicles, for example, and includes, as main components: a fuel cell stack 1 for generating electric power; and utility supply lines such as a hydrogen supply line, an air supply line, and a coolant supply line for supplying hydrogen as a gaseous fuel, air as a gaseous oxidizer, and a coolant to the fuel cell stack 1, respectively.

The fuel cell stack 1 is configured with a multiplicity of parallel-serial connected unit fuel cells (hereafter sometimes simply called "unit cells") each acting as a power generation cell having its fuel electrode (anode) 1a to be supplied with hydrogen, oxidizer electrode (cathode) 1b to be supplied with air, and solid polymer electrolyte 1c interposed therebetween. It is noted that respective fuel electrodes 1a in the fuel cell stack 1 and a vicinal fluid communication region associated therewith are sometimes collectively called "fuel electrode side", and that respective oxidizer electrodes 1b in the fuel cell stack 1 and a vicinal fluid communication region associated therewith are sometimes collectively called "oxidizer electrode side".

The unit cells are multi-staged to be stacked. In each power generation cell of the fuel cell stack 1, hydrogen is supplied to the fuel electrode 1a side, where it undergoes a catalytic reaction for its dissociation into a hydrogen ion and an electron. The hydrogen ion is moved through the electrolyte 1c to the cathode 1b, while the electron is conducted thereto via an external circuit, whereby electric power is transmitted. At the cathode 1b side where air is supplied, there occur chemical reactions among oxygen in the supplied air, hydrogen ions moved thereto, and electrons conducted thereto, which produce water to be wasted outside the system.

The electrolyte 1c is formed by a solid polymer membrane, in consideration of higher energy density, a decrease in cost, and a decrease in weight. The solid polymer membrane is an ion (proton) transmitting polymer membrane such as a fluororesin based ion-exchange membrane, which can serve as an ion-mobile electrolyte by inclusion of water to a saturated degree.

The hydrogen supply line includes a hydrogen tank 2 as a hydrogen source, for example, and is configured to supply hydrogen contained in the hydrogen tank 2 to the anode 1a side of the fuel cell stack 1 through a hydrogen supply pipe 3. The hydrogen supply pipe 3 is provided with a hydrogen pressure control valve 4, and a hydrogen pressure sensor 5. A detected value of the hydrogen pressure sensor 5 is fed back to control an opening of the hydrogen pressure control valve 4 to regulate a pressure of hydrogen to be supplied from the hydrogen tank 2 to the fuel cell stack 1. At the anode 1a side of the fuel cell stack 1, supplied hydrogen is not fully consumed, so an excessive amount of hydrogen is collected from each anode 1a of the fuel cell stack 1, to be recirculated via a hydrogen recirculation line 6. Recirculating hydrogen is mixed by an ejector 7 into hydrogen supplied from the hydrogen tank 2, to be again supplied to the anode 1a side of the fuel cell stack 1.

Connected to an outlet side of the anode 1a of the fuel cell stack 1 is a hydrogen waste line 8 provided with a purge valve 9 on a downstream side thereof (i.e., at a position downstream a portion where the hydrogen recirculation line 6 is branched). In the fuel cell system utilizing hydrogen in the recirculating manner, it is feared that the fuel cell stack 1 has a decreased efficiency because recirculation of hydrogen leads to accumulation of impurities such as nitrogen and CO within the hydrogen supply line to thereby lower a partial pressure of hydrogen. Nonetheless, this problem is solved by conducting hydrogen purge in a manner to open the purge valve 9 to waste impurities within the hydrogen supply line together with hydrogen to the system exterior, such as when the concentration of impurities is increased. Note that hydrogen to be wasted from the hydrogen supply line by such hydrogen purge is wasted outside the system after being sufficiently diluted by a dilution blower 10, for example.

The air supply line includes an air compressor 11 as an air source, and is configured to suck outside air by the air compressor 11 and to supply it to the cathode 1b side of the fuel cell stack 1 through an air supply line 12. Connected to 15 an outlet side of the cathode 1b of the fuel cell stack 1 is an air waste line 13, and oxygen which has not been consumed at the cathode 1b of the fuel cell stack 1 and other components in air are wasted through the air waste line 13.

The air supply line 12 and air waste line 13 are provided with an air pressure sensor 14 and an air pressure control valve 15, respectively, and a detected value of the air pressure sensor 14 is fed back to control the opening of the air pressure control valve 15 to thereby regulate the pressure of air to be supplied from the air compressor 11 to the cathode 1b side of the fuel cell stack 1. Further, placed downstream of the air waste line 13 is a muffler 16, and air wasted from the cathode 1b of the fuel cell stack 1 is passed through and muffled by the muffler 16 and then wasted to the system exterior.

The coolant supply line is configured to supply a coolant prepared by mixing an antifreezing agent such as ethylene glycol into water, for example, to the fuel cell stack 1, by driving a coolant pump 17 to recirculate the coolant through a coolant recirculation line 18. The coolant recirculation line 18 is provided with a radiator 19, and the coolant flowed out of the fuel cell stack 1 in a high temperature state after absorbing heat of the fuel cell stack 1 dissipates heat in the course of passing through the radiator 19 and is thus cooled.

Placed on the coolant recirculation line 18 near its exit from the fuel cell stack 1 is a temperature sensor 20 configured to detect the temperature of the coolant flowing out of the exit from the fuel cell stack 1. The temperature of the coolant detected by the temperature sensor 20 reflects the temperature of the fuel cell stack 1.

Operations of the various parts of the fuel cell system configured in the above manner are controlled by a control unit 21. The control unit 21 is configured as a microcomputer comprising a CPU, RAM, ROM, peripheral interfaces, and the like, and the CPU utilizes the RAM as a work area so as to execute various control programs stored in the ROM to thereby control an operation of the whole fuel cell system. Concretely, during normal running of the fuel cell system, the control unit 21 ascertains the whole system by monitoring values detected by various sensors including the hydrogen pressure sensor 5, air pressure sensor 14, and temperature sensor 20, and controls operations of respective parts including the hydrogen tank 2, hydrogen pressure control valve 4, air compressor 11, air pressure control valve 15, and coolant pump 17 in a manner to allow the fuel cell stack 1 to generate an electric power required by the system.

During the system startup, there is a system startup run conducted for bringing the fuel cell stack 1 into a power extractable state under control of the control unit 21, before actually extracting electric power from the fuel cell stack 1. Particularly, in the fuel cell system according to the present invention, the control unit 21 controls operation of the air compressor 11 so as to supply air in an amount larger than a reference flow required to bring the fuel cell stack 1 into the power extractable state, to the cathode 1b of the fuel cell stack 1 at an initial stage of the system startup run.

Operation control during the system startup run will be explained.

Although the fuel cell system used as a drive power source of a fuel cell vehicle is started up by turning on a starter switch of the fuel cell vehicle, the fuel cell stack 1 just after startup operation is not yet brought into a state capable of generating power, so the fuel cell stack 1 may be damaged if it tries to extract electric power from the fuel cell stack 1 in a heavy load state just after the startup operation. Thus, in this kind of fuel cell system, the system startup run is conducted to bring the fuel cell stack 1 into a power extractable state before actually extracting electric power from the fuel cell stack 1 after starting up the system, by supplying hydrogen and a reference flow of air to the anode 1a and cathode 1b of the fuel cell stack 1, respectively. Further, the system is changed over to a normal run at a stage where the system startup run is completed, so as to subsequently extract an electric power from the fuel cell stack 1. Namely, the system startup run is conducted during a period from startup of the fuel cell system such as by turning on the starter switch, to changeover to a normal run for actually extracting an electric power from the fuel cell stack 1. Here, in the system startup run, the reference flow of air supply for bringing the fuel cell stack 1 into a power extractable state, is set at an air flow required when a minimum load is applied to the fuel cell stack 1, for example.

Incidentally, in the solid polymer electrolyte fuel cell stack 1 adopting a solid polymer membrane as the electrolyte 1c, there has been confirmed a phenomenon where hydrogen loaded at the anode 1a side permeates through the electrolyte 1c comprising the solid polymer membrane and cross-leaks to the cathode 1b side during shutdown of the fuel cell system. Further, it is becoming apparent that cross-leak of hydrogen from the anode 1a side to the cathode 1b side leads to a state where a large amount of hydrogen is present on the fuel cell stack 1 side of the fuel cell stack 1 at system startup, depending on the timing of the next startup of the fuel cell system.

If the system startup run is conducted in the conventional manner of system startup in the state where a large amount of hydrogen is present on the cathode 1b side of the fuel cell stack 1 as described above, only air at the required minimum reference flow is supplied to the cathode 1b side of the fuel cell stack 1, thereby causing a fear in that the large amount of hydrogen present on the cathode 1b side is not sufficiently diluted by the air supplied to the cathode 1b, and thus the hydrogen in a high concentration state is wasted outside the system.

Thus, the fuel cell system according to the present invention is configured so that the control unit 21 controls operation of the air compressor 11 such that air at a flow rate larger than the reference flow is supplied to the cathode 1b of the fuel cell stack 1 during a preset period from starting air supply to the fuel cell stack 1 in conducting the system startup run when the fuel cell system is started up by turning on the starter switch, so that hydrogen present on the cathode 1b is sufficiently diluted by air supply at the increased flow and then wasted outside the system.

Namely, air during the increased flow is supplied to the cathode 1b of the fuel cell stack 1 during a preset period from the start of air supply to the fuel cell stack 1, so that the supplied air during the large flow is mixed with hydrogen present on the cathode 1b within the parts such as the fuel cell stack 1, air waste line 13 and muffler 16 connected thereto where a certain volume is ensured, thereby wasting the hydrogen at a decreased concentration outside the system.

Figure 2A:
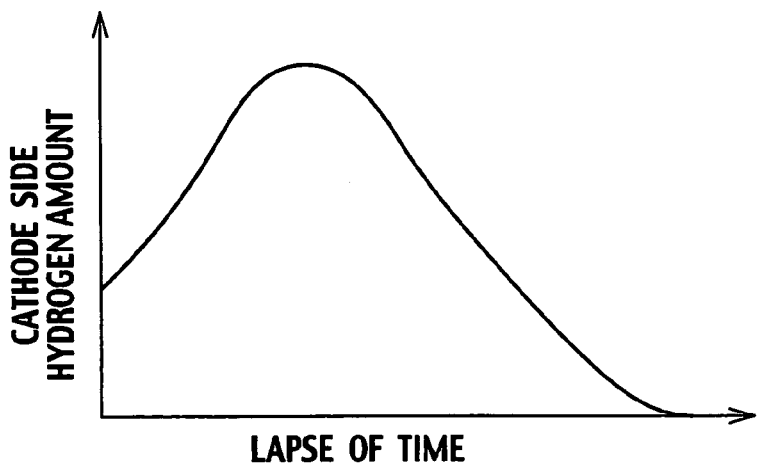
FIG. 2A is a graph of a relationship between the lapse of time "from a commencement of" (hereafter sometimes simply referred to "from") a previous system shutdown to a current system startup and the amount of hydrogen present on a cathode side of a fuel cell stack of the fuel cell system of FIG. 1.
Figure 2B:
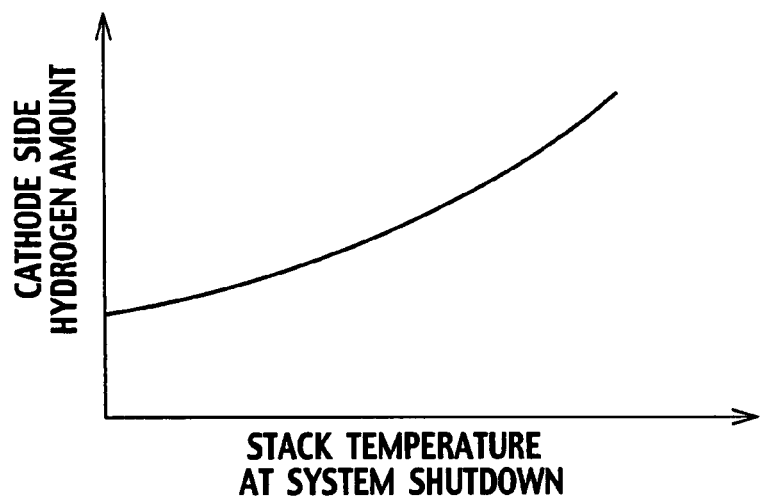
FIG. 2B is a graph of a relationship between the temperature of the fuel cell stack in the system shutdown and the cathode side hydrogen amount.
Figure 2C:
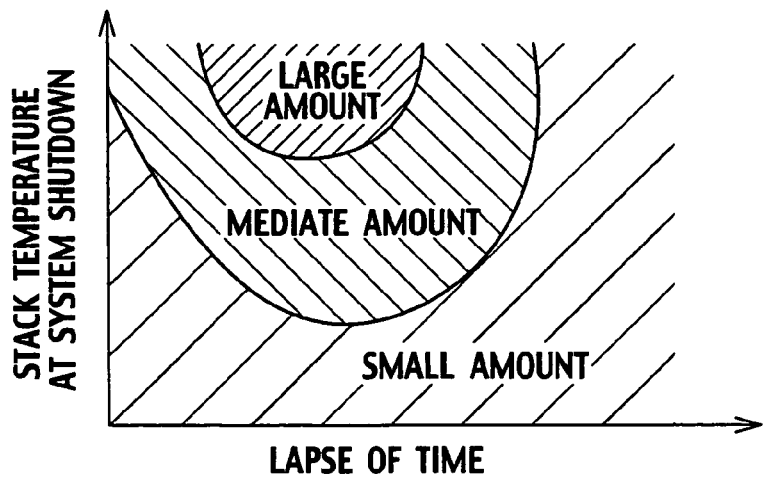
FIG. 2C is a graph of a relationship between the lapse of time from the system shutdown to the system startup and the fuel cell stack temperature in the system shutdown, concurrently mapping different regions of the cathode side hydrogen amount.

As shown in FIGS. 2A, 2B, and 2C, the amount of hydrogen present on the cathode 1b of the fuel cell stack 1 during the system startup mainly depends on the lapse of time from a previous system shutdown to the system startup at the current time, and the temperature of the fuel cell stack 1 at the previous system shutdown.

Namely, since cross-leak of hydrogen from the anode 1a side to the cathode 1b side of the fuel cell stack 1 progresses with the lapse of time, the amount of hydrogen present on the cathode 1b side gradually increases with the lapse of time until a certain stage after system shutdown, and reaches a peak at a certain stage (such as after a lapse of 10 minutes) as shown in FIG. 2A. Thereafter, the amount of hydrogen present on the cathode 1b side gradually decreases such as by a catalytic reaction on the cathode 1b side, and by diffusion to the outside.

Further, since the fuel cell stack 1 to be operated in a relatively high temperature state is gradually cooled by heat dissipation during system shutdown, higher temperatures of the fuel cell stack 1 at system shutdown lead to longer periods where the solid polymer membrane used as the electrolyte 1c is subsequently left in a high temperature state during system shutdown. Additionally, the solid polymer membrane tends to have larger hydrogen permeability coefficients at higher temperatures, so that higher temperatures of the solid polymer membrane during system shutdown lead to increased amounts of hydrogen to be cross-leaked from the anode 1a side to the cathode 1b side. Thus, as shown in FIG. 2B, higher temperatures of the fuel cell stack 1 at system shutdown lead to larger amounts of hydrogen present on the cathode 1b side of the fuel cell stack 1 at the next system startup.

FIG. 2C is provided by grouping amounts of hydrogen present on the cathode 1b side of the fuel cell stack 1 at system startup into three levels of large, mediate or medium, and small, and by obtaining a simple map representing a relationship among the hydrogen amounts, a lapse of time from the previous system shutdown to system startup at the current time, and a temperature of the fuel cell stack 1 at the previous system shutdown.

In this embodiment, there is previously obtained a maximum value of hydrogen which may be present on the cathode 1b side of the fuel cell stack 1 at system startup such as by an experiment adopting a real system or a simulative calculation in view of the above-described tendency, and there are previously set an increment of air supply flow and an increased air flow supply time, so as to allow hydrogen present on the cathode 1b side to be diluted to a preset allowable waste concentration or lower by the air supply during the system startup run even when the maximum amount of hydrogen is present on the cathode 1b side. Further, the control unit 21 is configured to control operation of the air compressor 11 such that air at a flow rate provided by adding the preset flow increment to the reference flow is supplied to the cathode 1b during a preset period of time from the start of air supply to the fuel cell stack 1.

Figure 3:
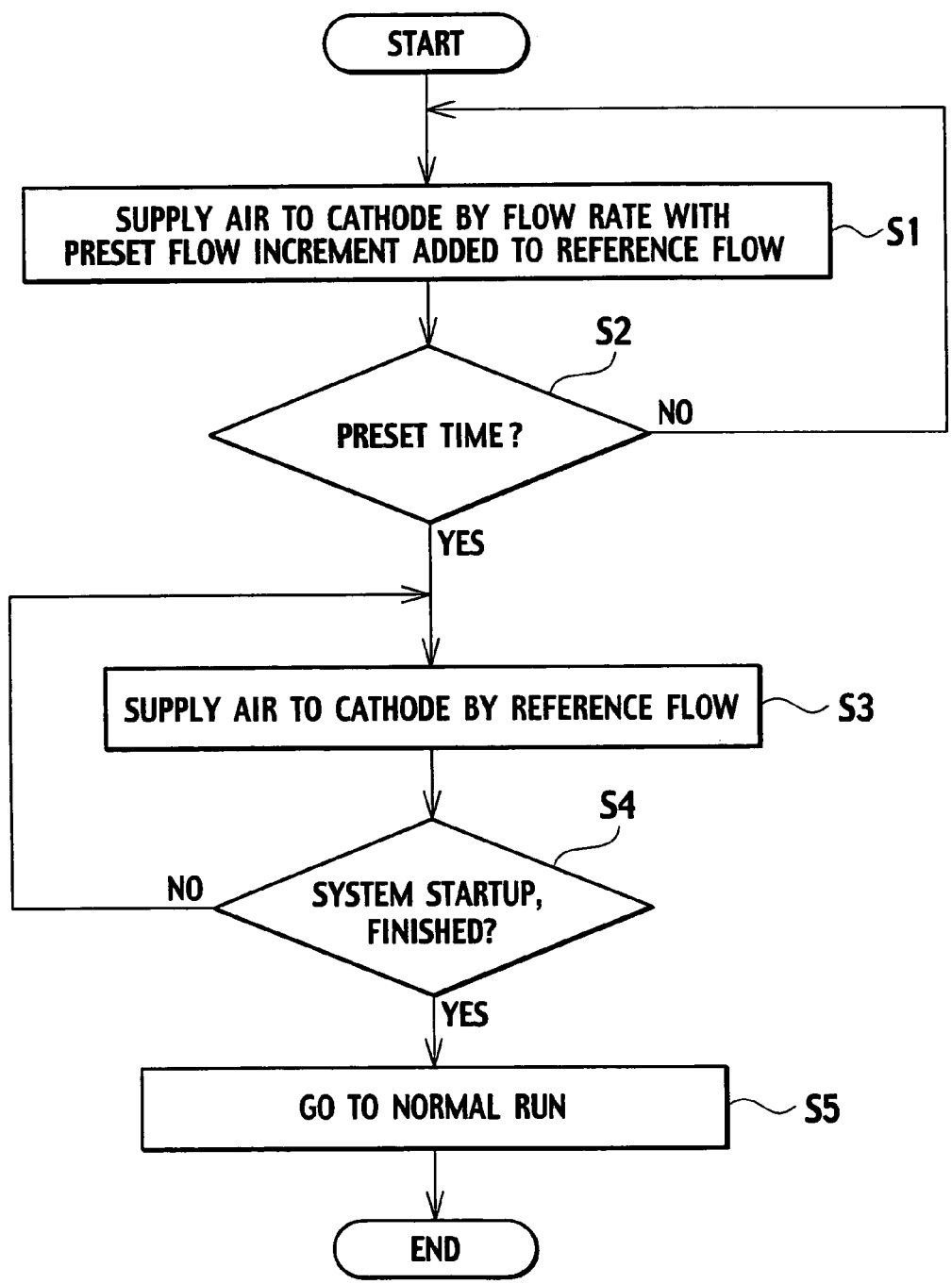
FIG. 3 is a flowchart of control actions for air supply in a system startup run of the fuel cell system of FIG. 1.

FIG. 3 is a flowchart of an example of air supply control to be executed at system startup in the fuel cell system of this embodiment.

In the fuel cell system of this embodiment, the system startup run is conducted when the system is started up, and the control unit 21 controls the operation of the air compressor 11 firstly at step S1 as the air supply control at current time, so that air at a flow rate provided by adding the preset flow increment to the reference flow is supplied to the cathode 1b of the fuel cell stack 1. The supply of air at the thus increased flow is continued until a lapse of the preset time.

When it is judged that the preset time has elapsed at step S2, the control unit 21 controls the operation of the air compressor 11 such that air at the reference flow is supplied to the cathode 1b of the fuel cell stack 1 at step S3. Note that the pressure of air to be supplied to the cathode 1b is kept at substantially the same pressure as that where air at the increased flow has been supplied thereto. This air supply at the reference flow is to be continued until completion of the system startup run. Then, when it is judged that the system startup run is terminated at step S4, the flow goes to a normal run at step S5, and the air supply control during the system startup run is terminated.

Figure 4A:
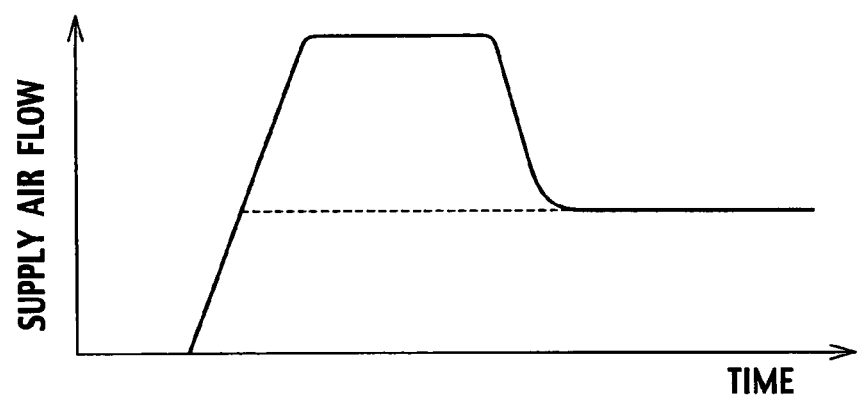
FIG. 4A is a graph of temporal changes of an air flow to be supplied to a cathode in the system startup.
Figure 4B:
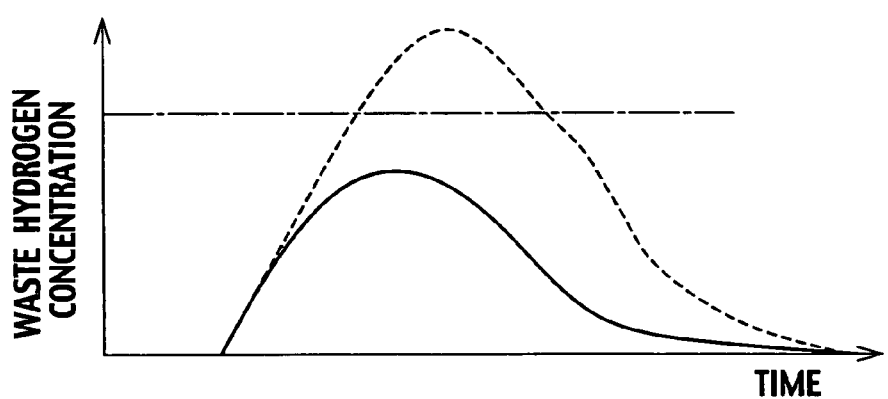
FIG. 4B is a graph of temporal changes of a waste hydrogen concentration in the system startup run, concurrently showing the supply air flow for comparison.

FIGS. 4A and 4B are graphs of a relationship between a flow rate of air to be supplied to the cathode 1b of the fuel cell stack 1 and a concentration of hydrogen to be wasted outside the system during the system startup in the fuel cell system of this embodiment, as compared with a conventional example. In FIG. 4A, represented by a solid line is a time-wise change of a supply air flow at startup of the fuel cell system of this embodiment, and represented by a broken line is a time-wise change of a supply of air flow during the system startup in the conventional example. In FIG. 4B, represented by a solid line is a time-wise change of a waste hydrogen concentration at startup of the fuel cell system of this embodiment, and represented by a broken line is a time-wise change of a waste of hydrogen concentration during the system startup in the conventional example.

In the conventional example as shown in FIG. 4A, air supply at the reference flow is continuously conducted from just after the start of air supply to the cathode 1b of the fuel cell stack 1. Contrary, in the fuel cell system of this embodiment, air supply is conducted at a flow rate provided by adding the preset flow increment to the reference flow, during a preset time after starting air supply to the cathode 1b of the fuel cell stack 1.

As a result, as shown in FIG. 4B, although hydrogen present on the cathode 1b of the fuel cell stack 1 is wasted outside the system without being sufficiently diluted in the conventional example, therefore the waste hydrogen concentration may exceed an allowable waste concentration level represented by a dashed line in this figure at a certain stage after starting air supply, it is possible in the fuel cell system of this embodiment to sufficiently dilute hydrogen present on the cathode 1b of the fuel cell stack 1 with air at the increased flow to thereby restrict the peak of waste hydrogen concentration to an allowable waste concentration level or lower.

In the fuel cell system of this embodiment as described above, the control unit 21 is configured to control the operation of the air compressor 11 such that air at a flow rate larger than the reference flow is supplied to the cathode 1b over a preset time after starting air supply to the cathode 1b of the fuel cell stack 1 upon conducting the system startup run. Thus, even in a state where hydrogen has cross-leaked from the anode 1a to the cathode 1b side of the fuel cell stack 1 during system shutdown such that a large amount of hydrogen is present on the cathode 1b side during the system startup, it is possible to dilute the hydrogen present on the cathode 1b side with air at the increased flow, and to waste the hydrogen in a state of sufficiently lowered concentration to the exterior.

Further, since hydrogen present on the cathode 1b side is diluted during the system startup based on the simple air supply control as described above without relying on such a technique for increasing the thickness of the solid polymer membrane adopted as the electrolyte 1c of the fuel cell stack 1, it becomes possible to effectively restrict the disadvantage in that hydrogen at a high concentration level is wasted from the cathode 1b side during the system startup, without causing a problem such as that the efficiency of the fuel cell stack 1 is deteriorated due to the increased thickness of the solid polymer membrane.

Second Embodiment

A fuel cell system according to a second embodiment of the invention will be explained. The fuel cell system of this embodiment has the same basic configuration as the first embodiment, and is characterized in that an increment of air flow, and an increased air flow supply time, are made variable upon conducting the system startup run. Namely, in the first embodiment, the maximum value of hydrogen has been obtained which may be present on the cathode 1b side of the fuel cell stack 1 during the system startup by previously conducting an experiment or the like, and the air supply flow increment and the increased air flow supply time have been set, as a sufficient flow rate and a time for allowing the maximum amount of air to be diluted to the preset allowable waste concentration or lower. However, in this fuel cell system of the second embodiment, the control unit 21 is configured to estimate, as required, the amount of hydrogen present on the cathode 1b side of the fuel cell stack 1 based on a lapse of time from a previous system shutdown to system startup at the current time, and a stack temperature at the previous system shutdown, and to set an air supply flow increment and an increased air flow supply time, to commensurate with the estimated hydrogen amount.

Hereinafter, like reference numerals as used in the first embodiment are used to denote identical elements to avoid their otherwise redundant description, and a process to be conducted by the control unit 21 which is characteristic in this embodiment will be mainly explained.

In the fuel cell system of this embodiment, realized in the control unit 21 as functions for controlling air flow during the system startup run, are a cathode side hydrogen amount estimator 21a, an air flow increment/increased flow supply time decider 21b, and an air flow controller 21c, as shown in FIG. 5.

The cathode side hydrogen amount estimator 21a is configured to estimate an amount of hydrogen present on the cathode 1b side of the fuel cell stack 1, such as when the fuel cell system is started up by inputting a startup signal thereto by turning on a starter switch, for example. As described above, the amount of the hydrogen present on the cathode 1b side of the fuel cell stack 1 depends on the lapse of time from the previous system shutdown to the system startup at the current time, and the temperature of the fuel cell stack 1 at the previous system shutdown. Thus, the cathode side hydrogen amount estimator 21a is configured to calculate the lapse of time from the previous system shutdown to the system startup at the current time, to read out information on the temperature of the fuel cell stack 1 at the previous system shutdown, and to estimate the amount of hydrogen present on the fuel cell stack 1 cathode 1b at the system startup, based on the calculated lapse of time and the read out information.

Although various methods are conceivable to calculate a lapse of time from a previous system shutdown to a system startup at the current time, there is a clock provided for outputting time point information from inside or outside of the fuel cell system in a manner so as to acquire the system shutdown time point from the clock at the system shutdown and store it in a memory, to acquire a system startup time point from the clock at the system startup and read out the system shutdown time point stored in the memory, and to obtain a difference therebetween, thereby calculating the lapse of time from the previous system shutdown to the system startup at the current time. It is of course possible to calculate the lapse of time by another method.

Further, although it is conceivable to directly measure or to estimate the temperature of the fuel cell stack 1 itself so as to acquire the temperature of the fuel cell stack 1, there is adopted here a detected value of the temperature sensor 20 placed on the coolant recirculation line 18 near its exit from the fuel cell stack 1, the coolant recirculation line 18 being configured to recirculatingly supply the coolant to the fuel cell stack 1. Namely, since the coolant temperature detected by the temperature sensor 20 reflects the temperature of the fuel cell stack 1 as described above, the detected value of the temperature sensor 20 is to be acquired during the system shutdown and stored in the memory as a stack temperature during the system shutdown, and the information on the stack temperature stored in the memory is read out during the system startup.

The air flow increment/increased flow supply time decider 21b is configured to determine an air supply flow increment, an increased air flow supply time, and the like at an initial stage of the system startup run, to commensurate with a hydrogen amount estimated by the cathode side hydrogen amount estimator 21a, i.e., an amount of hydrogen present on the cathode 1b side of the fuel cell stack, 1 during the system startup.

Figure 6A:
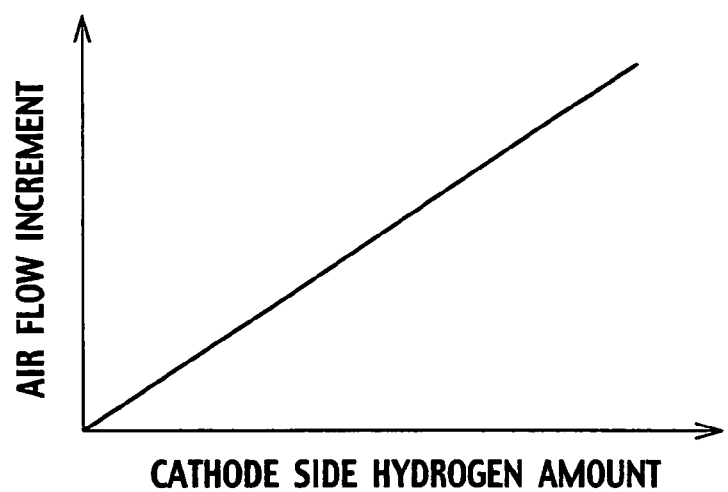
FIG. 6A is a graph of a relationship between a cathode side hydrogen amount and an air flow increment for dilution of waste hydrogen to be within a permissible range under a preset concentration in the second embodiment.

FIG. 6A shows a relationship between an amount of hydrogen present on the cathode 1b side of the fuel cell stack 1 during the system startup, and an air flow increment required to dilute the hydrogen to a preset allowable waste concentration level or lower. As shown in FIG. 6A, the larger the amount of hydrogen present on the cathode 1b side of the fuel cell stack 1 during the system startup, the larger the air flow increment required at the initial stage of the system startup run. The air flow increment/increased flow supply time decider 21b is configured to store such a relationship between the cathode side hydrogen amount and an air flow increment as a map, for example, and to refer to the map to thereby determine an air flow increment commensurate to a cathode side hydrogen amount when the same is estimated by the cathode side hydrogen amount estimator 21a during the system startup.

Figure 6B:
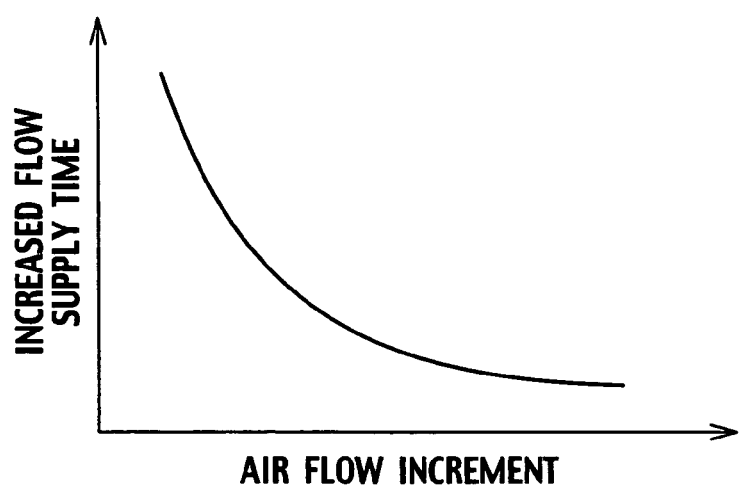
FIG. 6B is a graph of a relationship between the air flow increment and an increased flow supply time to be optimum in the second embodiment.

FIG. 6B shows a relationship between an air supply flow increment at an initial stage of the system startup run, and an increased air flow supply time. As shown in this FIG. 6B, larger air flow increments required at the initial stage of the system startup run lead to shorter times of increased air flow supply whereby hydrogen present on the cathode 1b side is allowed to be diluted to a preset allowable waste concentration level or lower and then wasted outside the system. Namely, larger air flow increments allow larger air flows to be instantaneously supplied to the cathode 1b side and acceleratedly mixed with hydrogen present on the cathode 1b side, thereby allowing the hydrogen present on the cathode 1b side to be sufficiently diluted at an early stage after the start of air supply. The air flow increment/increased flow supply time decider 21b is configured to store such a relationship between an air flow increment and an increased flow supply time as a map, for example, and to refer to the map to thereby determine an increased flow supply time commensurate with an air flow increment after deciding the air flow increment commensurate with a cathode side hydrogen amount.

The air flow controller 21c is configured to control the operation of the air compressor 11 to thereby control an air flow to be supplied to the cathode 1b of the fuel cell stack 1 during the system startup run. Namely, the air flow controller 21c controls the operation of the air compressor 11 such that the cathode 1b of the fuel cell stack 1 is supplied with air at a flow rate provided by adding an air flow increment determined by the air flow increment/increased flow supply time decider 21b to the reference flow required to bring the fuel cell stack 1 into a power extractable state, over a period from the start of air supply to a lapse of an increased flow supply time determined by the air flow increment/increased flow supply time decider 21b. After lapse of the increased flow supply time determined by the air flow increment/increased flow supply time decider 21b, the operation of the air compressor 11 is controlled to supply air at the reference flow to the cathode 1b of the fuel cell stack 1 until termination of the system startup run.

Figure 8:
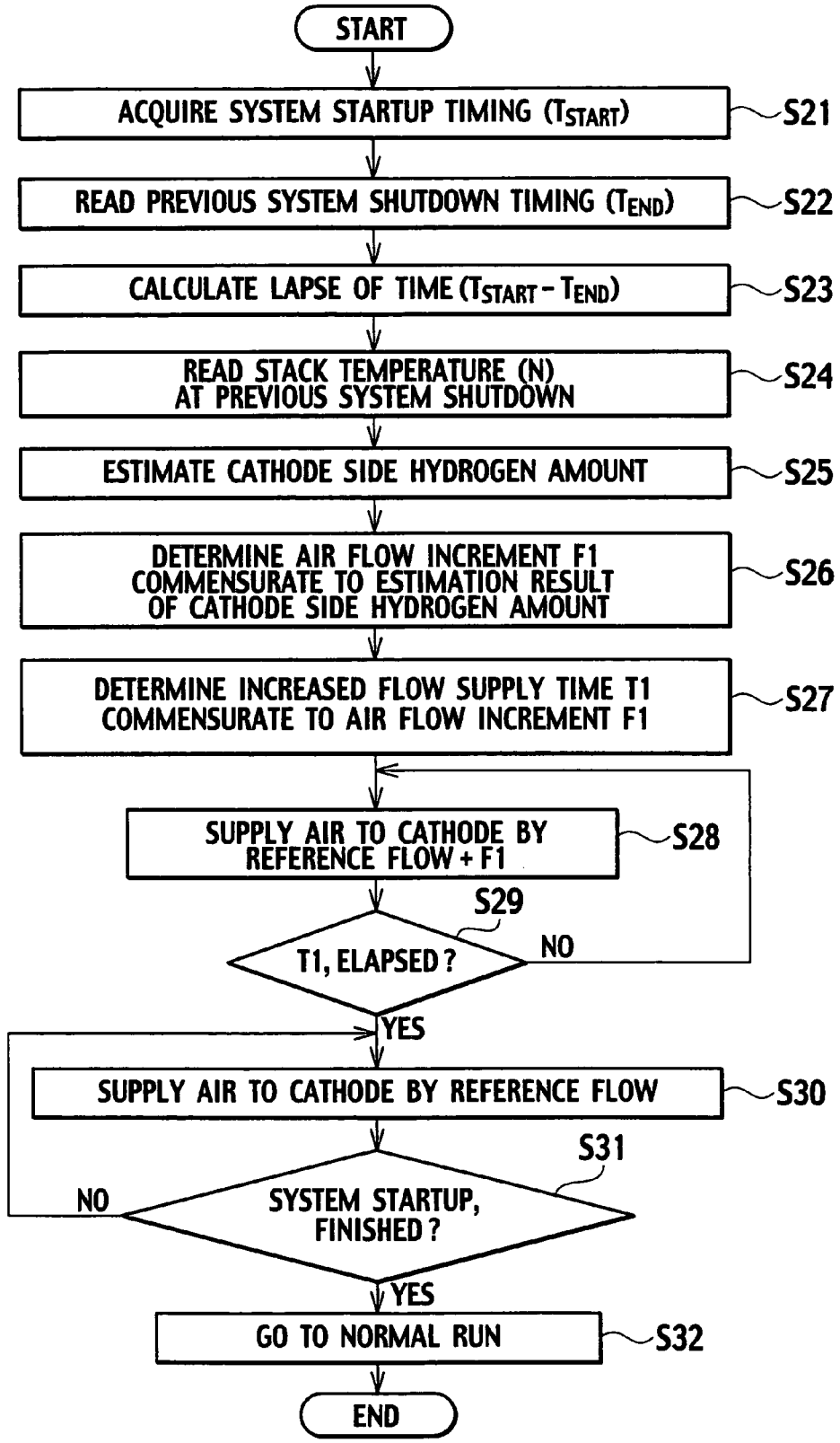
FIG. 8 is a flowchart of control actions for air supply in a system startup run of the fuel cell system according to the second embodiment.

FIG. 7 shows an example of a process to be executed during the system shutdown, and FIG. 8 shows an example of air supply control to be executed during the system startup, both in the fuel cell system of this embodiment.

As shown in FIG. 7, in terminating power generation at the fuel cell stack 1 to thereby shut down the fuel cell system of this embodiment, supply of hydrogen and air to the fuel cell stack 1 is firstly stopped at step S11, and time point information (system shutdown time point) $T_{END}$ at that time is acquired at step S12 from the clock provided at the interior or exterior of the fuel cell system. Next, a detected value N (stack temperature at system shutdown) of the temperature sensor 20 is acquired at step S13. Then, at step S14, the system shutdown time point $T_{END}$ acquired at step S12 and the stack temperature N during the system shutdown acquired at step S13 are written into the memory, and the process during the system shutdown is terminated.

Meanwhile, during the system startup as shown in FIG. 8, firstly there is time point information (system startup time point $T_{START}$) acquired at that time from the clock provided at the interior or exterior of the fuel cell system at step S21, and the system shutdown time point $T_{END}$ written into the memory during the previous system shutdown is read out from the memory at step S22. At step S23, the difference between the system startup time point $T_{START}$ and the system shutdown time point $T_{END}$ is acquired to thereby calculate the lapse of time ($T_{START}-T_{END}$) from the previous system shutdown to the system startup at the current time.

Next, at step S24, the stack temperature N during the system shutdown written into the memory at the previous system shutdown is read out from the memory. At step S25, the amount of hydrogen present on the cathode 1b side of the fuel cell stack 1 is estimated, based on the lapse of time ($T_{START}-T_{END}$) calculated at step S23 and the stack temperature N during the system shutdown read out from the memory at step S24.

Next, at step S26, an air supply flow increment F1 at an initial stage of the system startup run is determined to commensurate with the cathode side hydrogen amount estimated at step S25. At step S27, an increased air flow supply time T1 is determined to commensurate with the air supply flow increment F1 determined at step S26. At step S28, the operation of the air compressor 11 is controlled such that air at a flow rate provided by adding the air supply flow increment F1 determined at step S26 to the reference flow required to bring the fuel cell stack 1 into a power extractable state, is supplied to the cathode 1b of the fuel cell stack 1. The supply of air at the thus increased flow is continued until the lapse of the increased flow supply time T1 determined at step S27.

Further, when it is judged at step S29 that the increased flow supply time T1 determined at step S27 has elapsed, the operation of the air compressor 11 is then controlled at step S30 such that air at the reference flow is supplied to the cathode 1b of the fuel cell stack 1. Note that the pressure of air to be supplied to the cathode 1b is kept at substantially the same pressure as that where air at the increased flow has been supplied thereto. This air supply at the reference flow is to be continued until completion of the system startup run. Then, when it is judged that the system startup run is terminated at step S31, the flow goes to a normal run at step S32, and the air supply control during the system startup run is terminated.

In the fuel cell system of this embodiment as described above, air at a flow rate larger than the reference flow is supplied to the cathode 1b over a preset time after starting air supply to the cathode 1b of the fuel cell stack 1 upon conducting the system startup run, similarly to the first embodiment. Thus, even in a state where hydrogen has cross-leaked from the anode 1a to the cathode 1b side of the fuel cell stack 1 during the system shutdown such that a large amount of hydrogen is present on the cathode 1b side during the system startup, it is possible to dilute the hydrogen present on the cathode 1b side with air during the increased flow, and to waste the hydrogen outside, which is a sufficiently lowered concentration.

Particularly, in the fuel cell system of the second embodiment, there is an estimated amount of hydrogen present on the cathode 1b side of the fuel cell stack 1 during the system startup, and an air supply flow increment and an increased air flow supply time is determined to commensurate with the estimated amount of hydrogen. This allows hydrogen present on the cathode 1b side to be effectively diluted with air at an appropriate flow and be wasted outside without driving the air compressor 11 more than is required.

In the second embodiment, both the air supply flow increment F1 and the increased flow supply time T1 are determined to commensurate with an estimated result of a cathode side hydrogen amount during the system startup. However, it is possible to determine only an air supply flow increment F1 to commensurate with an estimated result of a cathode side hydrogen amount while adopting an increased flow supply time T1 which is a fixed value preset to be a sufficient time similarly to the first embodiment, to thereby supply air at a flow rate provided by adding the air supply flow increment F1 to the reference flow, over the increased flow supply time as preset in the above manner.

Further, in the second embodiment, there has been a cathode side hydrogen amount during the system startup estimated based on both a lapse of time from a previous system shutdown to a system startup at the current time, and a temperature of the fuel cell stack 1 at the previous system shutdown. However, it is possible to estimate a cathode side hydrogen amount to a certain extent, even based on only a lapse of time from a previous system shutdown to a system startup at the current time or only a temperature of the fuel cell stack 1 at the previous system shutdown. It is thus possible to obtain the same effect as the first embodiment, by setting an air supply flow increment F1 with a slight leeway based on the thus estimated cathode side hydrogen amount so that air at a flow rate provided by adding the increment F1 to the reference flow is supplied to the cathode 1b at an initial stage of the system startup run.

According to the fuel cell system of the present invention, air at a flow rate larger than the reference flow is supplied to the fuel cell over a preset time after starting air supply to the fuel cell upon conducting the system startup run. Thus, even in a state where hydrogen has cross-leaked from a fuel electrode side of the fuel cell to an oxidizer electrode side of the fuel cell during the system shutdown such that a large amount of hydrogen is present on the oxidizer electrode side during the system startup, it is possible to dilute the hydrogen present on the oxidizer electrode with air during the increased flow, and to waste the hydrogen outside, which is a sufficiently lowered concentration.

In detail, according to the fuel cell system of the present invention, air at a flow rate larger than the reference flow is supplied to the fuel cell over a preset time after starting air supply to the fuel cell upon conducting the system startup run, by estimating an amount of hydrogen present on the cathode, deciding an air supply flow increment to commensurate with the estimated hydrogen amount, and controlling an air supply flow, whereby air at a flow rate provided by adding the decided increment to the reference flow, is supplied to the cathode during the system startup run, thereby allowing for effectively restricting a disadvantage in that a high concentration of hydrogen is wasted during the system startup run, without deteriorating the efficiency of the fuel cell system.

The contents of Japanese Patent Application No. 2004-092564, filed to the Japanese Patent Office on Mar. 26, 2004, are incorporated herein by reference.

Although the present invention has been described based on the embodiments, the present invention is not limited thereto, and various modifications may be made thereto without departing from the spirit or scope of the present invention.

What is claimed is:

1. A fuel cell system including
  a solid polymer electrolyte fuel cell configured with
    a fuel electrode, an oxidizer electrode, and
a solid polymer membrane interposed therebetween,
the solid polymer electrolyte fuel cell being operative at a startup of the fuel cell system to enter a startup run of the fuel cell system, where
the fuel electrode is supplied with hydrogen, and
the oxidizer electrode is supplied with air at a reference flow to mature the solid polymer electrolyte fuel cell into a power extractable state, the fuel cell system comprising:
a hydrogen amount estimator configured to estimate an amount of hydrogen in the oxidizer electrode at the startup of the fuel cell system;
a flow increment decider configured to decide an increment of a supply flow of air to the oxidizer electrode, depending on the estimated amount of hydrogen; and
an air flow controller configured to control
the supply flow of air
to a sum of the reference flow and the decided increment
for an interval of time from a commencement of air supply to the solid polymer electrolyte fuel cell during the startup run of the fuel cell system.

2. The fuel cell system as claimed in claim 1, wherein the flow increment decider is configured to determine the interval of time from the commencement of air supply to the solid polymer electrolyte fuel cell in accordance with the decided increment of the supply flow of air.

3. The fuel cell system as claimed in claim 1, wherein the hydrogen amount estimator is configured to estimate the amount of hydrogen in the oxidizer electrode, depending on a lapse of time that is an interval time from a previous shutdown of the fuel cell system to a present startup of the fuel cell system.

4. The fuel cell system as claimed in claim 1, wherein the hydrogen amount estimator is configured to estimate the amount of hydrogen in the oxidizer electrode at the startup of the fuel cell system, depending on a temperature of the solid polymer electrolyte fuel cell at a commencement of a previous shutdown of the fuel cell system.

5. The fuel cell system as claimed in claim 1, wherein the hydrogen amount estimator is configured to estimate the amount of hydrogen in the oxidizer electrode, depending on
a lapse of time that is an interval time from a previous shutdown of the fuel cell system to a present startup of the fuel cell system, and
a temperature of the solid polymer electrolyte fuel cell at a commencement of the previous shutdown.

6. A fuel cell system including
a solid polymer electrolyte fuel cell configured with
a fuel electrode,
an oxidizer electrode, and
a solid polymer membrane interposed therebetween,
the solid polymer electrolyte fuel cell being operative at a startup of the fuel cell system to enter a startup run of the fuel cell system, where
the fuel electrode is supplied with hydrogen, and
the oxidizer electrode is supplied with air at a reference flow to mature the solid polymer electrolyte fuel cell into a power extractable state, the fuel cell system comprising:
hydrogen amount estimating means for estimating an amount of hydrogen in the oxidizer electrode at the startup of the fuel cell system;
flow increment deciding means for deciding an increment of a supply flow of air to the oxidizer electrode, depending on the estimated amount of hydrogen; and
air flow controlling means for controlling
the supply flow of air
to a sum of the reference flow and the decided increment
for an interval of time from a commencement of air supply to the solid polymer electrolyte fuel cell during the startup run of the fuel cell system.

7. A control method, comprising controlling a fuel cell system including
a solid polymer electrolyte fuel cell configured with
a fuel electrode,
an oxidizer electrode, and
a solid polymer membrane interposed therebetween,
the solid polymer electrolyte fuel cell being operative at a startup of the fuel cell system to enter a startup run of the fuel cell system, where
the fuel electrode is supplied with hydrogen, and
the oxidizer electrode is supplied with air at a reference flow to mature the solid polymer electrolyte fuel cell into a power extractable state, the control method further comprising:
estimating an amount of hydrogen in the oxidizer electrode at the startup of the fuel cell system;
deciding an increment of a supply flow of air to the oxidizer electrode, depending on the estimated amount of hydrogen; and
controlling
the supply flow of air
to a sum of the reference flow and the decided increment
for an interval of time from a commencement of air supply to the solid polymer electrolyte fuel cell during the startup run of the fuel cell system.

* * * * *